Figure 1:
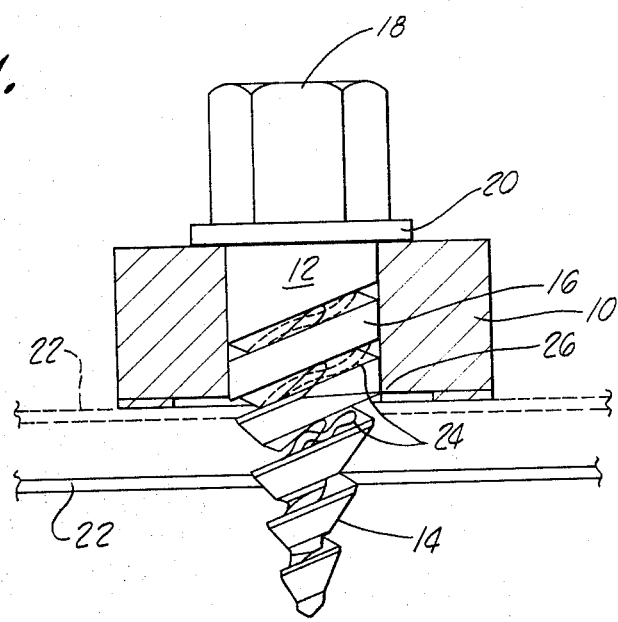

United States Patent [19]
Carr

[11] 3,761,192
[45] Sept. 25, 1973

[54] CHIPLESS ROUND HOLE CUTTER

[75] Inventor: Kelly B. Carr, West Covina, Calif.

[73] Assignee: Carr Engineering Corporation, Los Angeles, Calif.

[22] Filed: Dec. 22, 1971

[21] Appl. No.: 210,846

[52] U.S. Cl................ 408/22, 408/67, 408/199, 408/208, 85/46, 72/71, 30/240
[51] Int. Cl.................... B23b 51/02, B23b 51/08
[58] Field of Search................. 30/240; 85/46; 76/101 SM; 408/199, 202, 67, 230, 22; 72/71; 408/207, 208, 223, 224

[56] References Cited
UNITED STATES PATENTS
3,076,356  2/1963  Simich ............................. 408/223

Primary Examiner—Francis S. Husar
Attorney—Charles H. Schwartz

[57] ABSTRACT

A chipless round hole cutter including a screw shear and die body which cooperate to provide a round hole in a sheet of metal. The die body has an opening equal to the desired opening to be cut in the metal and the die body fits over the screw portion of the screw shear. The screw shear includes a tapered helical threaded section which is used to cut the metal and to carry and guide the cut metal within the groove to be retained in the threaded groove within the die body. The cutting edge of the screw shear adjacent to the die body provides for the final cutting of the hole to the desired size. The screw shear may be tapered along its entire length and with various size die bodies used to provide for a plurality of different size openings with a single screw shear or the screw shear may include a straight threaded section having a diameter substantially equal to the opening through the die body.

7 Claims, 2 Drawing Figures

PATENTED SEP 25 1973 3,761,192

CHIPLESS ROUND HOLE CUTTER

The present invention is directed to a chipless round hole cutter for cutting a blind hole from one side of a sheet of metal and with all of the cut metal brought to the outside so that no contaminants will be present on the other side of the sheet of metal.

It is often desirable to provide for a hole to be cut through a sheet of metal where it is difficult if not impossible to get to both sides of the sheet of metal. For example, in the construction of a boiler, it is desirable to form the boiler as a sealed chamber and with holes then cut into the wall of the boiler to allow for fittings to be mounted at various places on the boiler. Presently, it is necessary to provide for such holes to be cut prior to assembly of the boiler or at least before the boiler has been completely sealed.

Another area where it is desirable to cut a blind hole is in the installation of auxiliary oil filtering equipment for various types of combustion engines. For example, it is known that it is desirable to provide for additional filtering and purifying of oil for an automobile engine. Such devices are available and are usually connected as a bypass to detour a portion of the oil through these auxiliary filters. One connection to these auxiliary filters is usually from the oil pan. In order to make such a coupling to the oil pan, it is necessary to cut a hole in the pan to receive a fitting for a hose coupling to the auxiliary filter.

The present practice is to remove the oil pan to provide access to both sides of the oil pan so that a standard hole cutter which requires access to both sides may be used to cut the hole. It is obvious that such a procedure is time consuming, thereby greatly increasing the cost of the installation of such auxiliary oil filter. However, it would not be desirable to drill a hole from the exterior of the oil pan since such a drilling operation would undoubtedly provide for contaminants within the oil pan and such contaminants could have a deleterious effect on the oil. It is therefore desirable to provide for a round hole cutter which may be used from an exterior position and wherein a smooth round hole may be produced of a desired size and with all excess metal being brought to the outside so that no contaminants would be present within the oil pan.

The round hole cutter of the present invention includes a screw shear and a cooperating die body. The die body is a cylindrical member having generally a thick wall and with the inside diameter at at least one end of the die body equal to the size of the hole which is desired to be cut in the metal. The screw shear cooperates with the die body by fitting through the die body and having a flange portion to limit the extension of the screw shear through the die body. The forward portion of the screw shear which projects beyond the die body is tapered and includes a helical thread to act as the cutter for the metal. The portion of the screw shear adjacent to the end of the die body having the desired size opening provides for the final cutter to produce the desired hole in the sheet of metal.

In one embodiment of the round hole cutter of the present invention, the screw shear includes a first rearward section which has an outside diameter substantially equal to the size of the hole to be cut in the metal and with a forward section extending from this single diameter section and having a taper to provide for the cutting of the metal. A second embodiment of the round hole cutter of the present invention includes a screw shear which is tapered throughout its length and with the die body having a cooperating tapered opening to receive the screw shear and with the length of the die body controlling the opening to be cut in the metal so that, by using a plurality of die bodies having different lengths, a single screw shear may be used to provide for cutting holes of different diameters. In either embodiment, the spiral of material which is cut as the hole is being formed is pulled upwardly within the groove of the helical thread and is retained in the grooves of the screw shear within the die body so that no excess material will be present on the inside surface of the sheet of metal.

In the operation of the round hole cutter of the present invention, the screw shear is slipped through the die body to have the tapered portion extend beyond the die body. Initially, a relatively small opening is punched into the metal so that the tapered end of the screw shear may be inserted in this small opening. The screw shear may now be turned in a direction to provide for a cutting of the metal and in order to facilitate such a turning of the screw shear, the end of the screw shear opposite to the tapered portion may either contain a handle or may be formed as a member including straight sides so as to receive a wrench. At this time, the die body is still maintained loosely on the screw shear and the particular position of the die body is not important.

As the screw shear is turned to continue to cut the metal, the screw shear and die body approach the metal until the die body is pressing up against the metal and with the flange portion of the screw shear now providing pressure against one end of the die body. The cutting edge of the screw shear immediately adjacent the portion of the die body which is abutting the metal provides for a final cut of the metal to produce a round hole and with all of the excess metal cut by the screw shear contained within the grooves of the screw shear and within the die body.

Figure 2:
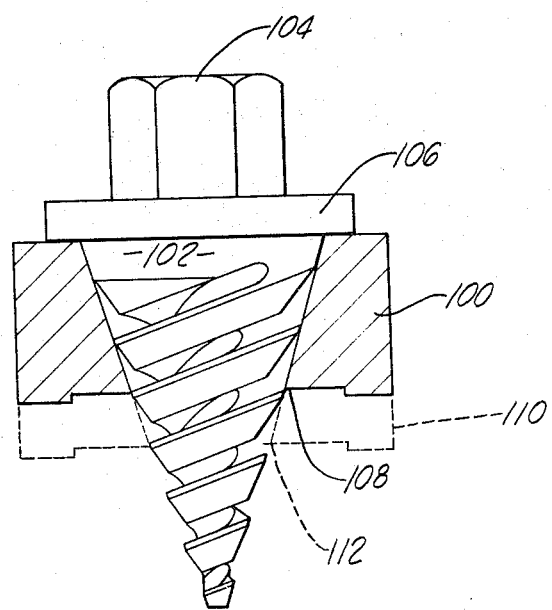

A clearer understanding of the invention will be had with reference to the following description and drawings wherein:

FIG. 1 illustrates a first embodiment of the invention for providing for a single size hole in a sheet of metal; and FIG. 2 illustrates a second embodiment of the invention for providing for holes of different diameters to be cut in the metal using die bodies of various length.

In FIG. 1, a first embodiment of a round hole cutter is shown and includes a die body 10 and a screw shear 12. The screw shear includes a first taper threaded portion 14, a second threaded portion 16 of a single diameter and with the threads in the first and second portions 14 and 16 being continuous. The threads may actually be formed as a double lead screw to provide for a balanced cutting of the sheet metal. Specifically, the threads include a cutting edge and a deep groove to receive the material as it is cut. The end of the screw shear opposite to the cutting end is formed as the head of a bolt 18 so as to receive a wrench such as a socket wrench. A flange member 20 operates as a stop and bearing surface between the screw shear 12 and the die body 10.

The inner diameter of the die body 12 is substantially equal to the size hole to be cut and in the embodiment of FIG. 1 the single diameter portion 16 of the screw shear has a length substantially equal to the length of the die body and with the tapered portion 14 of the screw shear extending from the die body 10 when the die body 10 is fully positioned over the single diameter portion 16.

In the operation of the round hole cutter of the present invention, a sheet metal 22 is to have an opening cut to a particular diameter and with all excess material removed to the outside. Specifically, a small hole is punched through the sheet metal 22 so as to insert the forward end of the tapered portion 14 of the screw shear to initiate the cutting operation. The double threads of the tapered portion 14 will cut the metal in a double spiral upon turning of the screw shear 12 in a clockwise direction. The metal that is cut from the sheet metal 22 enters the grooves of the threads and is pulled upwardly within the grooves as the cutting operation proceeds. This can be seen by the metal 24 shown in the grooves of the thread of the screw shear.

As the cutting operation continues, the sheet metal 22 is located adjacent to the die 10 as shown by the dotted position of the sheet metal 22. At this time, the cutting edge 26 performs its final cut to provide for a hole in the sheet metal 22 of the proper diameter. This final cutting edge cooperates with the edge of the die 10 to produce a clean round opening in the sheet metal 22 of the desired diameter. All of the metal which has been cut from the sheet metal 22 is now located within the groovs of the single diameter portion 16 and is therefore located within the die 10. Therefore, all of the metal that has been cut is brought to the outside and is retained there to thereby prevent any contaminants from being on the inside.

FIG. 2 illustrates a second embodiment of the invention including a die body 100 and a screw shear 102. The screw shear 102 is tapered throughout its length and cooperates with a tapered opening in the die body 100. The screw shear also includes a head portion 104 and a flange 106 to cooperate with the die 100 in a manner similar to that described with reference to the embodiment of FIG. 1. Specifically, the length of the die body 100 determines the opening to be cut in the sheet metal, since the length of the die body 100 determines the inside diameter of the die body at the position 108. It can therefore be seen that various size holes may be cut in the sheet metal by using die bodies of different length. For example, as shown by the dotted lines 110, a die body having a greater length than the die body 100 will provide for a smaller opening to be cut in the sheet metal since the inside diameter of the die body at the position 112 is smaller than the inside diameter of the die body 100 at the position 108.

It can therefore be seen that the present invention provides for a simple structure to produce a round hole in sheet metal from one side only of the sheet metal and with all the cut metal brought to the one side and there being no cut metal on the other side of the sheet metal. The structure is simple in that it includes a screw shear and a die body and the operation of the round hole cutter is also simple so that it may be accomplished by labor which is relatively unskilled.

Although the invention has been described with reference to particular embodiments, the invention is only to be limited by the appended claims.

I claim:

1. A round hole cutter, including
    a die body formed with a central opening and having an inner diameter at a first end of the die body substantially equal to the hole to be cut,
    a screw shear, including a threaded portion having cutting edges and having a length greater than the length of the die body,
    a flange member providing a stop between the screw shear and the die body and with the threaded portion inserted into the die body to extend from the first end of the die body and with the outer configuration of the threaded portion of the screw shear contained within the die body and conforming to the inner configuration of the opening through the die body and with the threaded portion of the screw shear extending from the first end of the die body tapered inwardly,
    the combination of the screw shear and die body providing for a round hole to be cut through sheet material and with the cut material pulled upward and contained within the grooves between the threads to thereby bring all of the cut material to the outside to be stored in the grooves of the screw shear within the die body.

2. The round hole cutter of claim 1 wherein the portion of the screw shear contained within the die body has a single diameter and the die body has an opening of a single diameter.

3. The round hole cutter of claim 1 wherein the screw shear is tapered from one end to the other and with the die body having a tapered opening corresponding to the taper of the screw shear and with a plurality of such die bodies of different lengths used to provide for cutting holes of different diameters.

4. A round hole cutter for cutting a round hole through sheet material and for insertion from a first side of the sheet material and with all of the cut material pulled to the first side, including
    a die body having an opening extending therethrough and with the inner diameter of the die body at one end substantially equal to the size of the hole to be cut in the sheet material, and
    a screw shear having a helical thread extending from a first end of the screw shear to a second end and with the screw shear having a length greater than the length of the opening through the die body to provide for a portion of the screw shear extending past the die body when the screw shear is inserted into the die body and with the portion of the screw shear extending past the die body tapered and with the portion of the screw shear maintained within the die body having an outer configuration conforming to the inner configuration of the opening through the die body.

5. The round hole cutter of claim 4 wherein the screw shear includes a section contained within the die body of a single diameter and wherein the opening through the die body is of a single diameter.

6. The round hole cutter of claim 5 wherein the helical thread is formed as a double helix to provide for balanced cutting of the sheet material.

7. The round hole cutter of claim 4 wherein the screw shear is tapered from one end to the other and the opening through the die body is tapered to conform to the taper of the screw shear.

* * * * *